Patented Feb. 16, 1932

1,845,896

UNITED STATES PATENT OFFICE

NICOLAAS ANTHONY JOHANNES VOORHOEVE, OF EINDHOVEN, NETHERLANDS, ASSIGNOR TO N. V. PHILIPS' GLOEILAMPENFABRIEKEN, OF EINDHOVEN, NETHERLANDS, A LIMITED LIABILITY COMPANY OF THE NETHERLANDS

VOLTAGE REGULATING DEVICE FOR SUPPLY SYSTEMS COMPRISING VARIABLE SPEED-DYNAMOS

Application filed November 14, 1928, Serial No. 319,430, and in the Netherlands December 16, 1927.

The invention is concerned with voltage-regulating devices and more particularly with a device for keeping substantially constant within narrow limits, the terminal voltage of a generator whose number of revolutions is subject to large variations. The device is principally destined for electrical train-illumination installations operating with a continuous-current dynamo driven from the carriage-axle, and with a so-called buffer battery.

Figure 1:
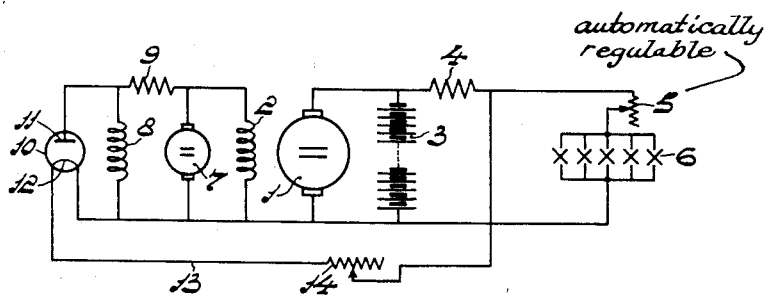
Figure 2:
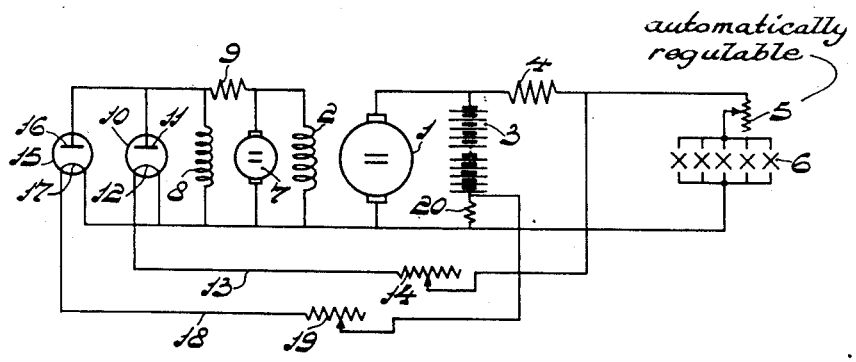

In the accompanying sheet of drawings:

Figures 1 and 2 are diagrammatic views, respectively, of two forms of the invention.

The invention consists in that the field winding either of the generator itself or of a special exciting dynamo has connected in parallel with it an electron discharge device whose internal resistance decreases with an increasing number of revolutions of the generator, and inversely.

The said discharge device may consist of one or more diodes which are connected in parallel and whose incandescent cathodes are fed by the generator.

As in general the lamps of the installation will have to burn at a voltage which is lower than the generator voltage required to charge the battery to a sufficient extent, it is advisable to connect the poles of the incandescent cathodes of the said diodes respectively to one of the terminals of the generator and to the end of a resistance which is located in the load-circuit of the generator and whose other end is connected to the other terminal of the generator.

In one convenient embodiment of the invention, as shown in Figure 1 the required current is supplied by a direct-current generator 1 having a field winding 2 and when said generator is at rest or at too low a number of revolutions the direct current is supplied by a buffer battery 3 which is charged by the generator 1. In the service main of the generator is included a fixed resistance 4 in which a small voltage drop is produced when the lamps are illuminated, the purpose thereof being hereinafter set forth more fully. In addition the service main comprises an automatically regulable resistance 5 and a group of lamps 6 connected in parallel. The use of the automatic resistance 5 is known: It serves to produce in the said resistance a constant voltage drop which is independent of the number of lamps 6 that is switched on at the moment.

The field winding 2 of the generator is fed by an auxiliary or exciting dynamo 7 which energizes itself through the intermediary of a resistance 9 by means of a field winding 8. In parallel with the latter is mounted a diode 10 whose anode 11 is connected to one of the ends of the winding 8 the other end of which is connected to one of the poles of an incandescent cathode 12, the other pole of the latter being connected through a lead 13 and a regulable resistance 14 to that end of the resistance 4 which is further from the generator 1.

The working of the device is as follows. Assuming that when the train has a speed of about 25 k. m. hourly the terminal voltage of the generator 1 has risen to such an extent that the latter is connected by means of one of the relays known for this purpose to the service main, the terminal voltage of the generator will have, at a further increasing number of revolutions, a tendency to rise still more, which has to be prevented. This is effected in consequence of the filament of the diode becoming more strongly heated so that the internal resistance of the diode decreases and the current in the field winding 8 of the small exciting dynamo 7 is weakened. This causes the current in the field coil 2 to decrease so that as a result thereof the terminal voltage of the generator 1 remains substantially constant notwithstanding the larger number of revolutions.

The lead 13 may also be connected directly through the resistance 14 to the upper generator terminal. However, the represented device in which this connection is made at a point beyond the small resistance 4 has to be preferred as now in the day-time the voltage of the generator is maintained at the amount which in the evening has to be applied to the lamps plus the resistance 5 while in the evening the generator voltage will be some volts more, namely the value of the voltage drop occurring in the resistance 4.

The device according to Figure 2 is quite similar to that according to Figure 1 but it contains some extra elements which are provided for safety and which prevent the current passing through the battery 3 from exceeding a predetermined value. For this purpose, in parallel with the diode 10 is mounted another diode 15 comprising an anode 16 and a filament 17, the latter being in parallel with a resistance 20 which is connected between the generator terminals and in series with the buffer battery 3. The cathode 17 bears consequently the voltage drop occurring in the resistance 20 except the voltage drop produced in a regulable resistance 19 which is connected in the lead 18. Now the diode 15 is so adjusted that there is substantially no emission by the filament so long as the current intensity in the branch comprising the battery 3 and the resistance 20 remains under a definite value. When, however, this value is surpassed, the cathode 17 begins to emit; the internal resistance of the diode 15 decreases, and since the latter is connected in parallel with the field winding 8 of the exciting dynamo, the terminal voltage of the generator, in accordance with that described with reference to Figure 1, decreases until the current intensity in the branch comprising the battery 3 and the resistance 20 will be reduced to the admissible value. Thus one obtains not only a protection of the battery 3 in the case of an overdischarge of the latter or of a short-circuit occurring therein, but also an additional protection against the inadmissibly high increase of the voltage of the generator 1, for example when the diode 10 might get out of order as the said increase of the voltage would be attended with a strong increase of the charging current within the battery 5, this being thus rendered impossible.

What I claim is:

1. A device for keeping substantially constant the voltage of an electric supply system, fed by an electric generator, at a varying number of revolutions, the said generator having at least one field winding and terminal, comprising a buffer battery connected to said generator, an electron discharge device having a cathode and anode, means connecting the cathode of the said discharge device to the terminals of the said generator, a second discharge device having a cathode and anode, a resistance, means connecting the cathode of the second discharge device with the terminals of the said resistance, and means connecting the said resistance in series with the said buffer battery.

2. A device for keeping substantially constant the voltage of an electric supply system, fed by an electric generator, at a varying number of revolutions, the said generator having at least one field winding and terminal, comprising a resistance included in the load-circuit of the generator, a buffer battery connected to said generator, one end of said resistance being connected to one of the terminals of the said generator, at least one electron discharge device having a cathode and an anode, means connecting the said discharge device in parallel with a field winding of the generator, means connecting one terminal of the said cathode with the terminal of the generator other than that to which one end of said resistance is connected, and means connecting the other terminal of the said cathode to the end of the said resistance opposite from that connected to the generator terminal, whereby the supply voltage can be maintained substantially constant, while the excess voltage of the generator can be employed to charge the battery.

3. A device for keeping substantially constant the voltage of an electric generator at a varying number of revolutions and having at least one field winding and terminal, comprising an auxiliary or exciter generator, at least one field winding for the said last-mentioned generator, an electric discharge device having a cathode and anode, means connecting the said discharge device in parallel with the field winding of the said exciter generator, a second discharge device having a cathode and an anode in parallel with the field winding of the said exciter generator, a battery across the main generator, a resistance in series with the said battery and the said main generator, and means connecting the cathode of the second discharge device with the terminals of said resistance.

4. A device for keeping substantially constant the voltage of an electric generator at a varying number of revolutions and having at least one field winding and terminal, comprising a buffer battery connected to said generator, an auxiliary or exciter generator, at least one field winding for the said last-mentioned generator, an electric discharge device having a cathode and an anode, means connecting the said discharge device in parallel with the field winding of the said exciter generator, a second discharge device having a cathode and an anode in parallel with the said field winding of the exciter generator, a resistance, means connecting the cathode of the second discharge device with the terminals of the said resistance, and means connecting the said resistance in series with said battery.

5. A device for keeping substantially constant the voltage of an electric generator at a varying number of revolutions and having at least one field winding and terminal, comprising a buffer battery connected to the said generator, an auxiliary or exciter generator, at least one field winding for the said last-mentioned generators, an electric discharge device having a cathode and an anode, means connecting the said discharge device in parallel with the field winding of the said exciter generator, a second discharge device having a cathode and an anode in parallel with the said field winding of the said exciter generator, a resistance in series with the said battery and said exciter generator, means connecting the cathode of the second discharge device with the terminals of the said resistance, means connecting the said resistance in series with the said battery, a second resistance included in the load-circuit of the first mentioned generator, means connecting one end of the second resistance to the terminal of the buffer battery opposite to that connected to the first mentioned resistance, and means connecting the other terminal of the second resistance to the cathode of the first discharge device.

In testimony whereof I have signed my name to this specification.

NICOLAAS ANTHONY JOHANNES VOORHOEVE.